United States Patent
Gong et al.

(10) Patent No.: US 9,559,898 B2
(45) Date of Patent: Jan. 31, 2017

(54) AUTOMATICALLY CONFIGURING DATA CENTER NETWORKS WITH NEIGHBOR DISCOVERY PROTOCOL SUPPORT

(71) Applicant: VMware, Inc., Palo Alto, CA (US)

(72) Inventors: QingChao Gong, Shanghai (CN); Lei Zhang, Shanghai (CN); Lei Ding, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/576,812

(22) Filed: Dec. 19, 2014

(65) Prior Publication Data
US 2016/0182279 A1 Jun. 23, 2016

(51) Int. Cl.
*H04L 12/24* (2006.01)
*H04L 12/46* (2006.01)
*H04L 12/931* (2013.01)

(52) U.S. Cl.
CPC ....... *H04L 41/0803* (2013.01); *H04L 12/4641* (2013.01); *H04L 41/12* (2013.01); *H04L 49/00* (2013.01)

(58) Field of Classification Search
USPC .............................................................. 718/1
See application file for complete search history.

(56) References Cited

U.S. PATENT DOCUMENTS

| | | | | |
|---|---|---|---|---|
| 9,025,533 B1* | 5/2015 | Lok | ..................... | H04L 12/4679 370/328 |
| 2003/0140132 A1* | 7/2003 | Champagne | ........ | H04L 41/0856 709/223 |
| 2008/0043640 A1* | 2/2008 | Smith | ................. | H04L 63/0272 370/255 |
| 2010/0046525 A1* | 2/2010 | Gilmartin | ........... | H04L 12/4641 370/395.53 |
| 2011/0154327 A1* | 6/2011 | Kozat | ..................... | G06F 9/505 718/1 |
| 2011/0283278 A1* | 11/2011 | Murrell | ................. | G06F 9/5077 718/1 |
| 2012/0016970 A1* | 1/2012 | Shah | .................... | G06F 9/45558 709/220 |
| 2012/0278802 A1* | 11/2012 | Nilakantan | ......... | G06F 9/45558 718/1 |
| 2015/0163100 A1* | 6/2015 | Graf | ....................... | H04L 41/12 370/255 |

* cited by examiner

*Primary Examiner* — Edan Orgad
*Assistant Examiner* — Saumit Shah
(74) *Attorney, Agent, or Firm* — Patterson & Sheridan LLP (57) ABSTRACT

Techniques are disclosed herein for configuring a virtual network. One embodiment provides a computer-implemented method that includes receiving a request to add network interface cards (NICs) of a new virtual machine (VM) host to the virtual network, and determining, using a protocol by which network devices advertise information, ports of at least one physical switch to which the NICs are connected. The method further includes determining, based on a predefined network configuration document, virtual local area networks (VLANs) which are enabled on the ports of the at least one physical switch to which the NICs are connected. In addition, the method includes assigning the NICs to ports of at least one virtual switch in the virtual network based on the VLANs as determined.

18 Claims, 4 Drawing Sheets

FIG. 4

AUTOMATICALLY CONFIGURING DATA CENTER NETWORKS WITH NEIGHBOR DISCOVERY PROTOCOL SUPPORT

BACKGROUND

Computer virtualization is a technique that involves encapsulating a computing machine platform into a virtual machine (VM) that is executed under the control of virtualization software running on a hardware computing platform (also referred to herein as "host server" or "host"). A group of hardware computing platforms may be organized as a cluster to provide resources for VMs. In a data center, it is common to see hundreds, even thousands, of VMs running on multiple clusters of host servers.

A virtual infrastructure (VI) administrator may use virtualization management software to manage virtual machine configurations and computing resource allocations. One feature of the virtualized computing environment controlled by the virtualization management software is virtual networking VMs can be created with software-based virtual network adapters that are logically connected to a virtual switch that may be further connected to physical network adapters installed in the host computer. In turn, the physical network adapters can be coupled to physical switches. Some of the ports of a physical switch can be assigned to one or more virtual local area networks (VLANs) defined in the physical network (e.g., to implement a traffic isolation scheme).

Namespace-based application containers may be connected to a physical network in a manner similar to that of virtual machines. A namespace-based (or any other type) application container is an isolated execution space provided by an operating system to an application. Multiple containers may be provided by a single operating system instance running within a virtual machine or directly on a physical computer. Each container may be provided with its own network address, with the host operating system functioning as a virtual switch to provide communication between multiple containers on the same host and between containers and the outside world.

One approach for managing virtual network connections in data centers with a large number of VMs running on multiple host servers is the "distributed virtual switch" (DVSwitch) described in U.S. Pat. No. 8,195,774, incorporated in its entirety herein by reference. A DVSwitch permits virtual switches on multiple host servers to be managed as if ports of those virtual switches belonged to a single switch, the DVSwitch. The DVSwitch may have uplinks which connect to physical network adapters, as well as VM ports which provide connections for VMs. Some of the VM ports on the DVSwitch (or groups of the VM ports) can be assigned to a particular VLANs defined in the physical network (e.g., to comply with a defined traffic isolation scheme).

When a new host is added to the cluster, physical network adapters (also referred to herein as "network interface cards" (NICs) or "physical network interface cards" (PNICs)) of the new host may be connected with Ethernet cables to physical switches. Further, a NIC can be connected to a port of a physical switch assigned to a particular VLAN. Because servers and networks are typically administered by separate teams who may be located in different places, the network administrator may connect NICs of the new host to physical switches and notify the VI administrator that the new host has been added to the network. However, in order for the VI administrator to be able to configure the virtual network properly, additional information about the physical network configuration may be required. For example, to properly connect the NICs of the new host with a DVSwitch, the VI administrator needs to know which NICs are connected to which VLANs in order to comply with the traffic isolation scheme currently in place. Typically, the VI administrator must file a ticket with the network administrator to obtain such additional information, which adds undesirable delay to the virtual network configuration process. For example, the network administrator may take 1-2 business days or longer to answer the ticket with the required information, especially when the VI administrator and network administrator are in different geographic locations.

SUMMARY

One embodiment of the present disclosure provides a computer-implemented method of configuring a virtual network. The method generally includes receiving a request to add network interface cards (NICs) of a new host to the virtual network, and determining, using a protocol by which network devices advertise information, ports of at least one physical switch to which the NICs are connected. The method further includes determining, based on a predefined network configuration document, virtual local area networks (VLANs) which are enabled on the ports of the at least one physical switch to which the NICs are connected. In addition, the method includes assigning the NICs to an uplink of at least one virtual switch in the virtual network based on the VLANs as determined.

Further embodiments of the present invention include, without limitation, a non-transitory computer-readable storage medium that includes instructions that enable a computer system to implement one or more aspects of the above methods, as well as a computer system configured to implement one or more aspects of the above methods.

DETAILED DESCRIPTION

Embodiments presented herein provide techniques for configuring a virtual network. When a new host is added to the cluster, that host may be physically connected to the network, but network interface cards (NICs) of the host must still be assigned to uplinks of virtual switches to configure the virtual network. As used herein, an uplink is a port connected to a physical Ethernet adapter, providing a connection between the virtual switch, such as a distributed virtual switch DVSwitch, and the physical network. A DVSwitch in particular may include uplinks assigned to an uplink port group, as well as VM ports that provide logical connection points among virtual devices, and between virtual and physical devices, and which may be assigned to one or more VM port groups. Each VM port group of a given DVSwitch can be assigned to one or more virtual local area networks (VLANs) defined in the physical network. "VLANs" are layer-2 network partitions that create multiple, distinct broadcast domains, as is well known in the art.

In one embodiment, a network administrator provides a network configuration document that specifies physical network information, such as information identifying the physical switches in the network, ports on the physical switches, and VLANs enabled on the ports. When a new host is added to the cluster, a network management application can automatically assign NICs of the new host to the proper uplinks of DVswitch(es) using the network configuration document and information identifying physical switches and ports that is retrieved via Link Layer Discovery Protocol (LLDP), or a similar protocol. In an embodiment, the network management application may create a DVswitch with LLDP; assign the NICs of the new host to the temporary virtual switch; retrieve, using LLDP, physical switch and port IDs for the ports to which the NICs are connected; query the network configuration document to determine VLANs enabled on the ports identified by the physical switch and port IDs; and re-assign the NICs to the correct uplinks of actual virtual switches (e.g., DVSwitches) based on the determined VLANs.

LLDP is used herein as a reference example of a protocol by which network devices share information, such as their identity, capabilities, and neighbors. It should be understood that in alternative embodiments, other information sharing protocols may be used in lieu of LLDP. Similarly, DVSwitches are used herein as an example of a virtual switch, and alternative embodiments may employ virtual switches other than DVSwitches.

Figure 1:
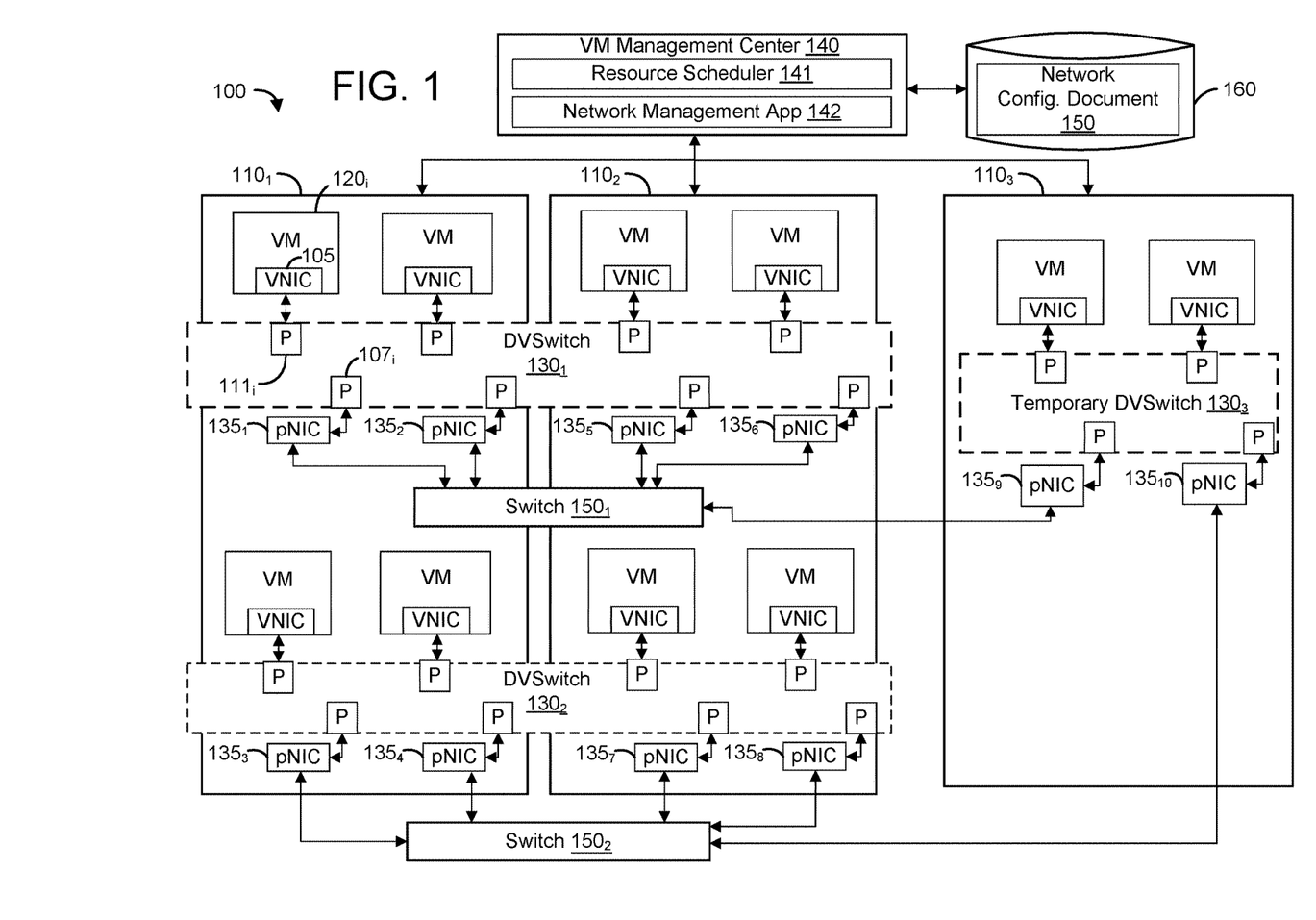
FIG. 1 illustrates a system in which an embodiment may be implemented.

FIG. 1 illustrates a system 100 in which an embodiment may be implemented. As shown, the system 100 includes a plurality of host servers 110 (e.g., host servers $110_{1-3}$), a virtual machine (VM) management server 140, one or more distributed virtual switches (DVSwitches) 130 (e.g., DVSwitches $130_{1-2}$), and one or more physical switches (e.g., physical switches $150_{1-2}$). Host servers $110_{1-3}$ may be constructed on conventional, typically server-class, hardware platforms that include one or more central processing units (CPUs), memory, and physical network interface cards (PNICs) 135 (e.g., PNICs $135_{1-10}$). As shown, each of the host servers $110_{1-3}$ includes a plurality of VMs $120_i$ running therein. Host servers $110_{1-3}$ are configured to deliver virtualization-based distributed services to information technology environments. Each host server 110 provides a virtualization layer that abstracts processor, memory, storage, and/or networking resources into multiple VMs 120 that run side-by-side on the same host server 110. In one embodiment, virtualization software may be installed directly on the server hardware and inserts a virtualization layer between the hardware and the operating system. Alternatively, virtualization software may run on top of a commodity operating system—a "hosting operating system"—that manages system resources and supports LLDP.

DVSwitches $130_{1-2}$ are software abstractions of physical switches. Each DVSwitch 130 includes a plurality of distributed virtual ports $111_i$ (also referred to herein as "VM ports"), each coupled to a virtual NIC (VNIC 105) of a VM $120_i$. Each DVSwitch 130 also includes a plurality of uplinks 107, each coupled to a PNIC 135. Each DVSwitch 130 may permit a variety of configuration options. For example, a user may assign VLANs to VM port groups, security profiles, and/or limit the amount of traffic that VMs can generate. As shown, DVSwitches $130_{1-2}$ each span hosts $110_{1-2}$, thereby permitting a user to manage virtual ports of virtual switches on those hosts as though they were part of larger virtual switches, namely one of DVSwitches $130_{1-2}$. From the user's perspective, specific knowledge of settings and state of individual virtual ports of virtual switches is unnecessary. As a result, the DVSwitch represents a convenient abstraction of underlying logic implementing links between VNICs and virtual switches. This approach also allows users to manage the DVSwitch as an abstraction of a physical switch connecting each of the VMs to a particular local area network (LAN). Because DVSwitches abstract out the settings of individual virtual switches and virtual ports, the user only needs to be concerned with attaching the DVSwitch to each VNIC.

Each VM $120_i$ running in hosts $110_{1-3}$ may be logically connected to a DVport 111 of a DVSwitch 130 and, in turn, logically connected to a physical NIC (PNIC) $135_{1-10}$ in one of host servers $110_{1-3}$ through an uplink 107. Each PNIC 135 is itself connected to one or more physical networks and communicates with other PNICs and the outside world via a router or a physical switch. In the present example, hosts $110_{1-2}$ each interact with DVSwitches $130_{1-2}$, which in turn are connected to switches $150_{1-2}$, respectively. Host $110_1$ includes PNICs $135_{1-2}$ connecting DVSwitch $130_1$ to switch $150_1$, and PNICs $135_{3-4}$ connecting DVSwitch $130_2$ to switch $150_2$. In such a configuration, PNICs $135_{1-2}$ are assigned to uplinks 107 of DVSwitch $130_1$, and PNICs $135_{3-4}$ are assigned to uplinks 107 of DVSwitch $130_2$. Host $110_2$ includes corresponding components, although many other configurations are possible, as would be recognized by those skilled in the art.

Although not illustrated, it is also possible that instead of a hypervisor providing execution spaces for virtual machines, a host operating system may provide execution spaces for application containers, as previously described. In this case, there may be no VNICs, but instead an operating system application programming interface (API) for accessing network resources by the applications running within the container. The DVSwitch in this case would simply pass network data provided by packet payloads to the appropriate application namespace container based on destination address of the received network packet.

When a new host, such as host $110_3$, is added to the cluster, PNICs (e.g., PNICs $135_{9-10}$) of the new host cannot properly be assigned to uplinks of a DVSwitch without knowledge of the VLANs to which those PNICs are connected. As discussed, each DVSwitch may include VM ports, and each VM port or group of VM ports may have an assigned VLAN. Those VLANs may also be enabled (or not) on ports of physical switches. For example, if DVSwitch A has a VM port group 1 associated with VLAN A, then for a new PNIC to be assigned to the uplink port group of DVSwitch A, it should meet the minimum requirement of being connected to a physical switch port configured to enable VLAN A.

In one embodiment, a network administrator provides a network configuration document 150 that specifies how physical switches $150_{1-2}$ are configured. To determine whether PNICs $135_{9-10}$ are connected to physical switch ports on which particular VLANs are enabled so that PNICs $135_{9-10}$ can be assigned to DVSwitch(es) with the particular VLANs, a network management application 142 running in VM management server 140 connects the new PNICs $135_{9-10}$ to a temporary DVSwitch $130_3$ with LLDP enabled. It is also contemplated, though not shown, that network management application 142 may reside in a server separate from VM management server 140. Most modern Ethernet switches support LLDP, which permits setup information to be transmitted to and receive from the temporary DVSwitch when LLDP is enabled to both "listen" and "advertise" on the temporary DVSwitch $130_3$. With such LLDP support, network management application 142 retrieves information about the physical switches and ports that PNICs $135_{9\text{-}10}$ of new host $110_3$ are connected to. In particular, LLDP may be used to detect an untagged (i.e., native) VLAN of temporary DVSwitch $130_3$ to obtain port and switch identification information.

In one embodiment, network management application 142 may retrieve the ChassisID(s) and PortID(s) of the physical switch(es) and port(s) to which PNICs $135_{9\text{-}10}$ are connected. After obtained such information, network management application 142 queries network configuration document 150 to determine, based on the ChassisID(s) and PortID(s), the VLANs enabled on those ports. Network management application 142 then assigns the new PNICs $135_{9\text{-}10}$ to appropriate unlinks based on the VLANs to which the PNICs $135_{9\text{-}10}$ are connected. For example, if PNIC $135_9$ is connected to a port of switch $150_1$ with VLAN 1 enabled, and VLAN 1 is assigned to a VM port group of DVSwitch $130_1$, then network management application 142 PNIC $135_9$ may be assigned to an uplink of DVSwitch $130_1$. In particular, by iterating over each VM port group and its associated uplinks, information on how many VLANs an uplink should support can be collected. Network management application 142 may then assign the PNIC that support those VLANS to the uplink. If the network is complicated, the network management application 142 may select a PNIC that just meets these requirements.

In one embodiment, network configuration document 150 may be a JSON format document, as shown in Table 1:

TABLE 1

```
Switch Configuration
{
ConfigurationName
Switches[
    ChassisID
    Username
    Password
    Speed
    Ports[
        {
            PortID,
            [vLANs]
        },
        {
            PortID,
            [vLANs]
        }
    ]
]
}
```

Here, "ConfigurationName" is the name of the configuration file; "Switches" is a list of physical switches in the datacenter; "ChassisID" is the fully qualified domain name (FQDN) or internet protocol (IP) address of one of the physical switches in the "Switches" list, "Username" and "Password" are optional credentials for accessing the switch, which may be useful in development and testing environments; "Ports" is a list of ports of the switch, "PortID" is the physical ID of one of the ports in the "Ports" list; and "vLANs" is a list of vLANs enabled on the port. Given the ChassisID and PortID obtained with LLDP support, network management application 142 can determine the enabled VLANs by querying this JSON network configuration document, either via a web-based service such as Representational State Transfer (REST) or Simple Object Access Protocol (SOAP) or by simply downloading the JSON document and parsing it. In alternative embodiments, the network configuration document may include different information and/or be in other formats. For example, the network configuration document may be in any other format that can be parsed for the relevant information, such as an Extensible Markup Language (XML) document, Microsoft® Word document, and the network configuration document may omit certain information such as the optional credentials for accessing the switches.

In another embodiment, new hosts may be added or removed from the cluster during auto scaling, in which resources are dynamically added and removed based on resource usage. As discussed in greater detail below, a resource scheduler 141 monitors resource usage demands and powers VM hosts $110_{1\text{-}3}$ on or off, as appropriate. Although shown as running in VM management server 140, it should be understood that resource scheduler 141 and network management application 142 need not run in such a server and may, e.g., run in one of VM hosts $110_{1\text{-}3}$ or elsewhere. When a host is powered on and added to the cluster, resource scheduler 141 may request network management application 142 to configure the virtual network for such a new host, and network management application 142 may do so using network configuration document 150 and retrieved LLDP information.

Figure 2:
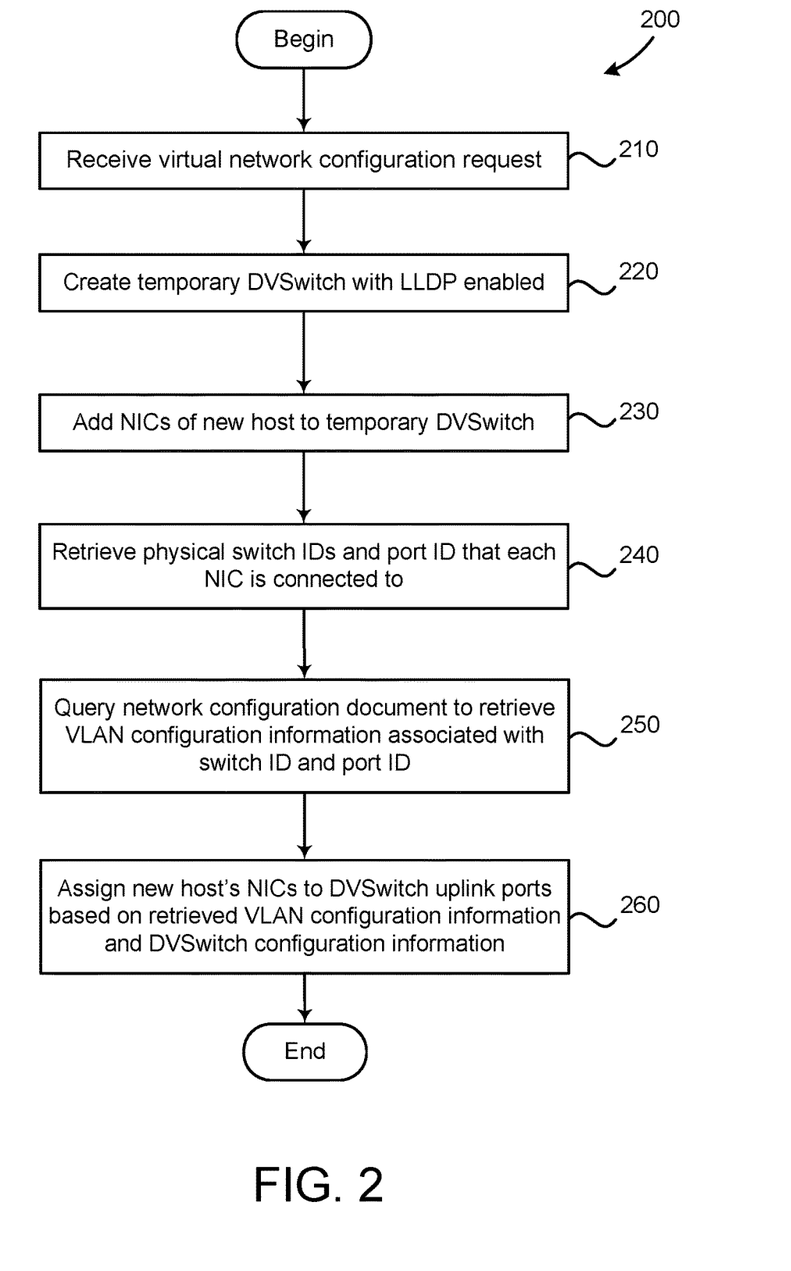
FIG. 2 illustrates a method for configuring a virtual network when a new host is added to a cluster, according to an embodiment.

FIG. 2 illustrates a method 200 for configuring a virtual network when a new host is added to a cluster, according to an embodiment. As shown, the method 200 begins at step 210, where network management application 142 receives a virtual network configuration request. As discussed, the virtual network needs to be configured separate from physically the connecting the new host to the network. The network configuration request may be issued whenever a new host is added to the virtual environment. For example, in auto scaling, hosts (e.g., hosts $110_{1\text{-}3}$) may be powered on or off by resource scheduler 141 in response to usage demands. When a host is powered on, resource scheduler 141 may request that the virtual network be configured to include the NICs of the new hosts. In another embodiment, new hosts may be added to the cluster in a development and testing environment. In such a case, the network administrator may issue the virtual network configuration request manually.

At step 220, network management application 142 creates a temporary DVSwitch with LLDP enabled. In one embodiment, the temporary virtual switch may be a distributed virtual switch with LLDP enabled. As discussed, LLDP permits network management application to obtain topology information, including the port and physical switch IDs of NICs which are attached to the temporary virtual switch. Most modern Ethernet switches support LLDP, which permits setup information to be transmitted to and received from the temporary DVSwitch when LLDP is enabled to both "listen" and "advertise" on the temporary DVSwitch. With such LLDP support, LLDP may be used to detect, e.g., the untagged (i.e., native) VLAN of the temporary virtual switch to obtain port and switch identification information. At step 230, network management application 142 adds the NICs of the new host to the temporary DVswitch.

Although discussed with respect to creating a temporary DVSwitch, which assumes that a DVSwitch application programming interface (API) retrieves LLDP information and thus a temporary DVSwitch should be created, techniques disclosed herein may be modified to not require a temporary DVSwitch. For example, in an alternative embodiment, routines for performing LLDP queries may be incorporated into the hypervisor on which DVswitch(es) are created.

Then at step 240, network management application 142 retrieves the physical switch ID and port ID that each NIC is connected to. In one embodiment, network management application 142 may invoke an API provided by, e.g., network management server 140 to retrieve the physical switch ID and port ID. For example, vSphere® API, which is commercially available from VMware® of Palo Alto, Calif., permits physical switch information such as ChassisID and PortID to be retrieved for physical NICs in the uplink port group of a DVSwitch.

At step 250, network management application 142 queries network configuration document 150 to retrieve the VLAN configuration information associated with the switch and port IDs obtained at step 240. In one embodiment, network configuration document 150 may be a JSON or XML document that provides physical switch configuration information, including physical switch IDs, port IDs, and VLANs enabled on particular ports. In one embodiment, network configuration document 150 may be a REST or SOAP resource that is accessible via a universal resource locator (URL) query. Of course, network configuration document 150 may instead be stored locally or accessed in some other way. By matching the physical switch ID and port ID of the new NIC to that listed in the network configuration document, it can be determined which VLAN(s) are enabled on the port having that port ID on the switch having that switch ID.

At step 260, network management application 142 assigns the new host's NICs to DVSwitch uplinks based on the VLAN configuration information retrieved at step 250 and DVSwitch VLAN configurations. As discussed, network management application 142 may iterate over each VM port group and its associated uplinks and gather information on how many VLANs are assigned to the VM port groups and thus how many VLANs each uplink should support. Network management application 142 may then assign a PNIC that support the determined VLANs to each uplink. For example, if a new PNIC is connected to a physical switch port on which VLAN 1 is enabled and VLAN 1 is assigned to a VM port group on DVSwitch A associated with a given uplink, then network management application 142 may assign the new PNIC to the given uplink of DVSwitch A. More generally, network management application 142 may assign the NIC to an uplink of any DVSwitch if minimum VLAN connectivity requirements 142 are met for that DVSwitch. As an example of minimum VLAN connectivity requirements, if PNIC 1 supports vLAN 1, VLAN 2 and VLAN 3 while PNIC 2 supports VLAN 1 and VLAN 2, then for an uplink that requires only VLAN 1 and VLAN 2, network management application 142 may select PNIC 2.

Figure 3:
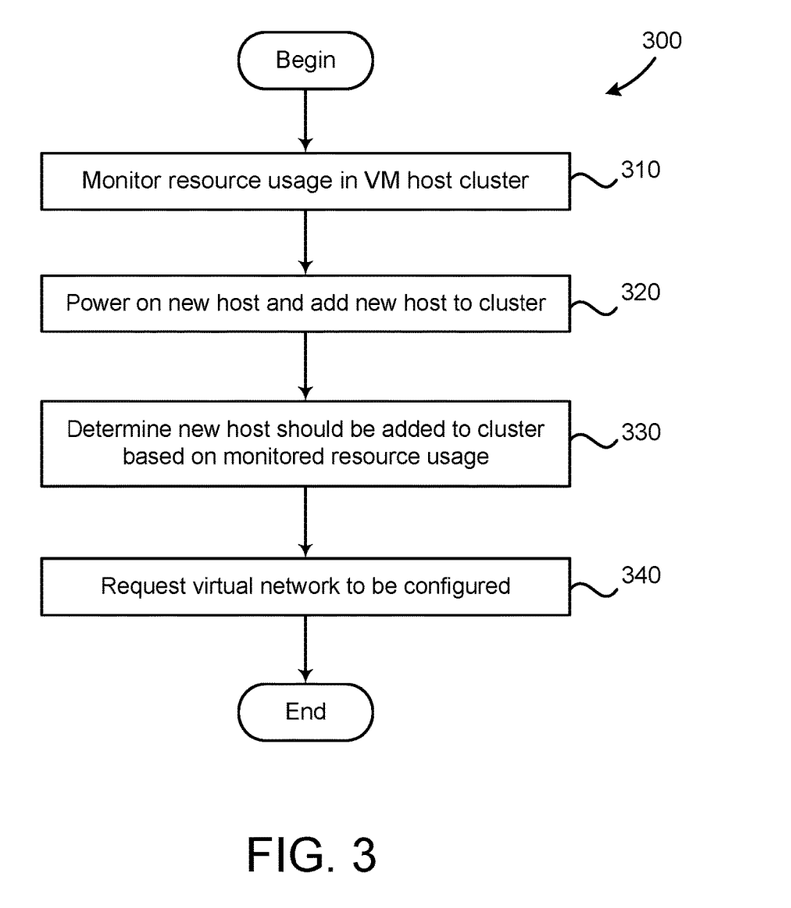
FIG. 3 illustrates a method for automatically configuring a virtual network during auto scaling, according to an embodiment.

FIG. 3 illustrates a method 300 for automatically configuring a virtual network during auto scaling, according to an embodiment. As discussed, auto scaling is a technique which dynamically adds and removes resources, such as VM hosts, based on resource usage. Method 300 begins at step 310, where resource scheduler 112 monitors resource usage in the VM host cluster. For example, resource usage may generally be greater during daytime and less during nighttime. A variety of techniques are known for monitoring resource usage in a host cluster and migrating VMs between hosts to balance computing capacity, optimize power consumption by powering off underutilized hosts, among other things.

vSphere® Distributed Resource Scheduler™ is one commercially available resource monitoring and balancing application from VMware®.

At step 320, resource scheduler 112 determines that a new host should be added to the cluster based on the monitored resource usage. For example, VM hosts may be powered off to conserve power when resource demand is low. When resource demand rises, resource scheduler 112 may add some of those hosts back to the cluster as new hosts.

At step 330, resource scheduler 112 powers on the new host and adds the host to the cluster. Then at step 340, resource scheduler 112 requests that the virtual network be configured. Resource scheduler 112 may send the request to network management application 142, which is responsible for assigning PNICs of the new host to an uplink of a temporary DVSwitch with LLDP enabled, retrieving physical switch and port identification information for ports that the PNICs are connected to, querying network configuration document 150 to determine the VLANs enabled on such a physical switch port, and assigning the PNICs to uplinks of the appropriate DVSwitches with the enabled VLANs. In one embodiment, network management application 142 may configure the virtual network according to method 200, discussed above.

Figure 4:
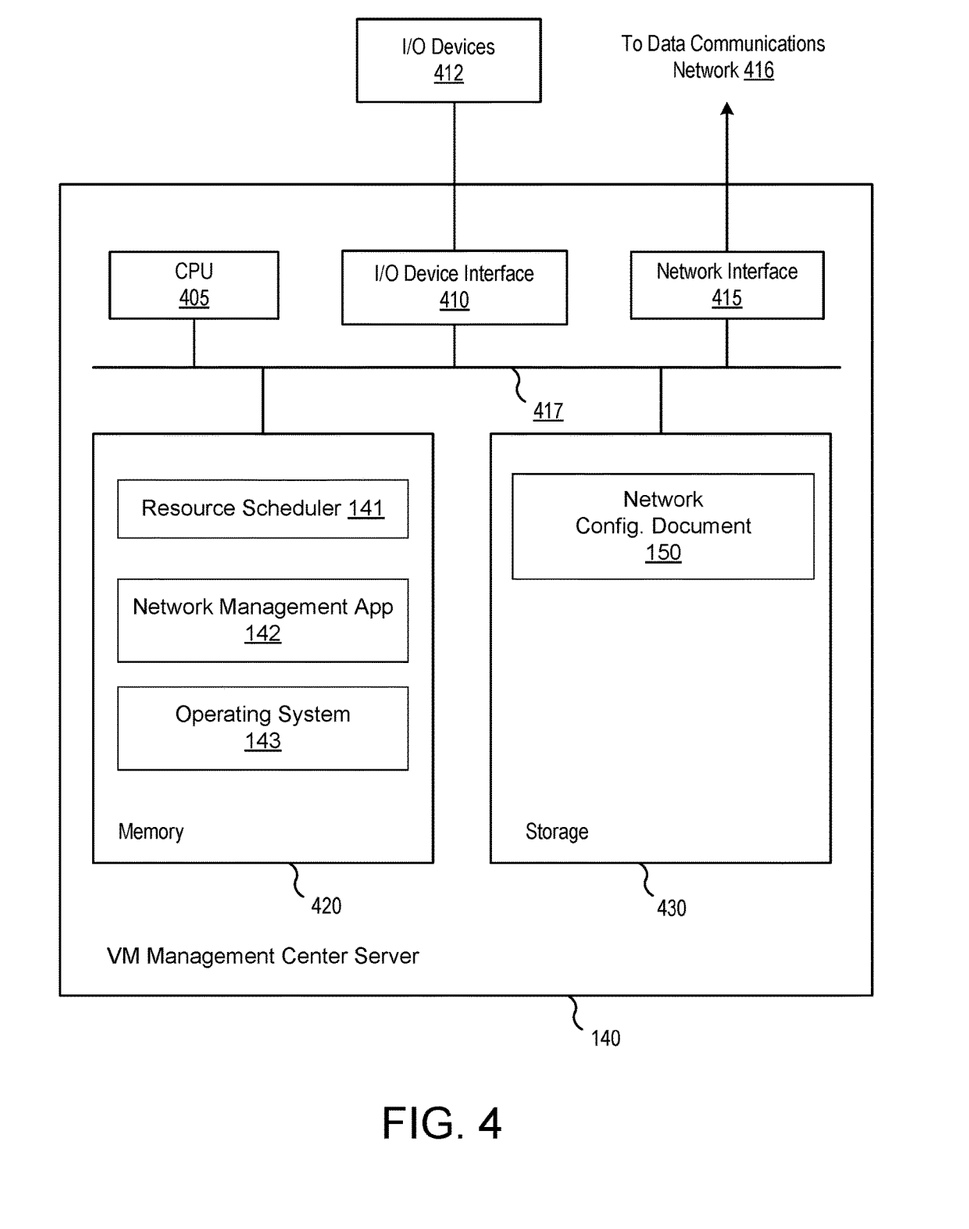
FIG. 4 illustrates a virtual machine management server, according to an embodiment.

FIG. 4 illustrates a virtual machine management server, according to an embodiment. As shown, VM management server 400 includes, without limitation, a central processing unit (CPU) 405, a network interface 415 connecting the system to a network 416, an interconnect 417, a memory 420, and storage 430. VM management server 400 may also include an I/O device interface 410 connecting I/O devices 412 (e.g., keyboard, display and mouse devices) to the system 400.

CPU 405 retrieves and executes programming instructions stored in memory 420. Similarly, CPU 405 stores and retrieves application data residing in memory 420. The interconnect 417 facilitates transmission, such as of programming instructions and application data, between CPU 405, I/O device interface 410, storage 430, network interface 415, and memory 420. CPU 405 is included to be representative of a single CPU, multiple CPUs, a single CPU having multiple processing cores, and the like. And the memory 420 is generally included to be representative of a random access memory. The storage 430 may be a disk drive storage device. Although shown as a single unit, the storage 430 may be a combination of fixed and/or removable storage devices, such as magnetic disk drives, flash drives, removable memory cards or optical storage, network attached storage (NAS), or a storage area-network (SAN). Further, although shown as a single computing system, one of ordinary skill in the art will recognized that the components of the VM management server 400 shown in FIG. 4 may be distributed across multiple computing systems connected by a data communications network.

As shown, the memory 420 includes an operating system 143, resource scheduler 141, and network management application 142. Illustratively, the operating system 143 may be Linux®. Network management application 142 receives requests and configures the virtual network when new VM hosts are added to the host cluster. In one embodiment, network management application 142 may create a temporary DVSwitch with LLDP enabled and add the NICs of a new host to the temporary DVswitch, retrieve the physical switch ID and port ID that each NIC is connected to via LLDP, query network configuration document 150 to retrieve the VLAN configuration information associated with the switch and port IDs obtained with LLDP, and assign the new host's NICs to DVSwitch uplinks based on the retrieved VLAN configuration information and DVSwitch VLAN configurations, as discussed above with respect to FIG. 2. Although network configuration document 150 is shown as stored locally in storage 430, network configuration document may instead by queried via a URL, downloaded and parsed, etc., as discussed above. Resource scheduler 141 is configured to monitor resource usage demands. In one embodiment, resource scheduler 141 may power VM hosts on or off based on the resource usage demands, and make requests to network management application 142 to configure the network for new hosts that are powered on and added to the cluster, as discussed above with respect to FIG. 3.

Advantageously, techniques disclosed herein provide automatic virtual network configuration when new VM hosts are added to a cluster. Such new VM hosts may be added, e.g., in development and testing environments or during auto scaling.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A computer-implemented method of configuring a virtual network, comprising:
   receiving a request to add one or more network interface cards (NICs) of a new host to the virtual network;
   creating a temporary virtual switch;
   assigning the one or more NICs of the new host to one or more uplinks of the temporary virtual switch;
   determining, using a protocol by which network devices advertise information, one or more ports of at least one physical switch to which the one or more NICs are connected;
   determining, based on a predefined network configuration document, a virtual local area network (VLAN) or VLANs which are enabled on the one or more ports of the at least one physical switch to which the one or more NICs are connected; and
   re-assigning the NICs from the one or more uplinks of the temporary virtual switch to one or more uplinks of at least one virtual switch in the virtual network based on the VLAN or VLANs as determined.

2. The method of claim 1, wherein the network configuration document includes information specifying, for each of the at least one physical switch, ports on the physical switch and VLANs enabled on the ports.

3. The method of claim 2, wherein the network configuration document further includes credentials for accessing the at least one physical switch.

4. The method of claim 1, wherein the protocol is Link Layer Discovery Protocol (LLDP).

5. The method of claim 1, wherein the request to add the one or more NICs is issued by a resource scheduler when the new host is added to a cluster of hosts during auto scaling.

6. The method of claim 1, wherein the request to add the one or more NICs is manually issued by a user adding the new host to a cluster of hosts.

7. The method of claim 1, wherein the network configuration document is queried via a uniform resource locator (URL).

8. The method of claim 1, wherein the network configuration document is one of a JavaScript Object Notation (JSON) or an Extensible Markup Language (XML) document.

9. The method of claim 1, wherein the at least one virtual switch is part of a distributed virtual switch, and wherein the one or more NICs are re-assigned to uplinks of the distributed virtual switch.

10. A non-transitory computer-readable storage medium embodying computer program instructions for configuring a virtual network, the computer program instructions implementing operations comprising:
receiving a request to add one or more network interface cards (NICs) of a new host to the virtual network;
creating a temporary virtual switch;
assigning the one or more NICs of the new host to one or more uplinks of the temporary virtual switch:
determining, using a protocol by which network devices advertise information, one or more ports of at least one physical switch to which the one or more NICs are connected;
determining, based on a predefined network configuration document, a virtual local area network (VLAN) or VLANs which are enabled on the one or more ports of the at least one physical switch to which the one or more NICs are connected; and
re-assigning the NICs from the one or more uplinks of the temporary virtual switch to one or more uplinks of at least one virtual switch in the virtual network based on the VLAN or VLANs as determined.

11. The non-transitory computer-readable storage medium of claim 10, wherein the network configuration document includes information specifying, for each of the at least one physical switch, ports on the physical switch and VLANs enabled on the ports.

12. The non-transitory computer-readable storage medium of claim 11, wherein the network configuration document further includes credentials for accessing the at least one physical switch.

13. The non-transitory computer-readable storage medium of claim 10, wherein the protocol is Link Layer Discovery Protocol (LLDP).

14. The non-transitory computer-readable storage medium of claim 10, wherein the request to add the one or more NICs is issued by a resource scheduler when the new host is added to a cluster of hosts during auto scaling.

15. The non-transitory computer-readable storage medium of claim 10, wherein the request to add the one or more NICs is manually issued by a user adding the new host to a cluster of hosts.

16. The non-transitory computer-readable storage medium of claim 10, wherein the at least one virtual switch is part of a distributed virtual switch, and wherein the one or more NICs are re-assigned to uplinks of the distributed virtual switch.

17. A system, comprising:
a processor; and
a memory, wherein the memory includes a program configured to perform operations for configuring a virtual network, the operations comprising:
receiving a request to add one or more network interface cards (NICs) of a new host to the virtual network,
creating a temporary virtual switch,
assigning the one or more NICs of the new host to one or more uplinks of the temporary virtual switch,
determining, using a protocol by which network devices advertise information, one or more ports of at least one physical switch to which the one or more NICs are connected,
determining, based on a predefined network configuration document, a virtual local area network (VLAN) or VLANs which are enabled on the one or more ports of the at least one physical switch to which the one or more NICs are connected, and
re-assigning the NICs from the one or more uplinks of the temporary virtual switch to one or more uplinks of at least one virtual switch in the virtual network based on the VLAN or VLANs as determined.

18. The system of claim 17, wherein the network configuration document includes information specifying, for each of the at least one physical switch, ports on the physical switch and VLANs enabled on the ports.

* * * * *